US006996681B1

(12) United States Patent
Autechaud

(10) Patent No.: US 6,996,681 B1
(45) Date of Patent: Feb. 7, 2006

(54) MODULAR INTERCONNECTION ARCHITECTURE FOR AN EXPANDABLE MULTIPROCESSOR MACHINE, USING A MULTILEVEL BUS HIERARCHY AND THE SAME BUILDING BLOCK FOR ALL THE LEVELS

(75) Inventor: Jean-François Autechaud, Paris (FR)

(73) Assignee: BULL, S.A., Louveciennes (FR)

( * ) Notice: Subject to any disclaimer, the term of this patent is extended or adjusted under 35 U.S.C. 154(b) by 0 days.

(21) Appl. No.: 09/558,377

(22) Filed: Apr. 26, 2000

(30) Foreign Application Priority Data

Apr. 26, 1999 (FR) .................................. 99 05266

(51) Int. Cl.
*G06F 12/00* (2006.01)
*G06F 15/16* (2006.01)
(52) U.S. Cl. ...................... 711/141; 711/147; 709/252
(58) Field of Classification Search ................ 711/141, 711/147, 113, 148; 370/409; 712/37; 710/108; 709/252
See application file for complete search history.

(56) References Cited

U.S. PATENT DOCUMENTS

| | | | | |
|---|---|---|---|---|
| 4,491,945 A | * | 1/1985 | Turner .......................... | 370/409 |
| 4,952,930 A | * | 8/1990 | Franaszek et al. .......... | 340/2.23 |
| 5,105,424 A | * | 4/1992 | Flaig et al. .................. | 709/243 |
| 5,396,596 A | * | 3/1995 | Hashemi et al. ............. | 711/113 |
| 5,734,922 A | * | 3/1998 | Hagersten et al. ............. | 712/37 |
| 5,983,326 A | * | 11/1999 | Hagersten et al. ............ | 711/147 |
| 6,041,376 A | * | 3/2000 | Gilbert et al. ............... | 710/108 |

FOREIGN PATENT DOCUMENTS

| | | |
|---|---|---|
| EP | 0 603 801 A | 6/1994 |
| EP | 0 817 076 A | 1/1998 |

OTHER PUBLICATIONS

Charlesworth, Alan, Starfire: Extending the SMP Envelope, Jan./Feb. 1998, IEEE, Micro, pp. 39-49.*
Sihin-Ichito Mori: "A Distributed shared memory and cache architectures" Supercomputing 93, Nov. 15-19, 1993, pp. 740-749, XP000437411, Los Alamitos, entire document.

\* cited by examiner

*Primary Examiner*—Kevin Verbrugge
(74) *Attorney, Agent, or Firm*—Miles & Stockbridge P.C.; Edward J. Kondracki

(57) ABSTRACT

The present invention relates to a modular interconnection architecture for an expandable multiprocessor machine. It comprises a first interconnection level (MI) comprising connection agents (NCSi) that connect the multiprocessor modules and handle the transactions between the multiprocessor modules, and a second interconnection level (SI) comprising external connection nodes (NCEj) that connect the nodes (Nj) to one another and handle the transactions between the nodes (Nj). Each external connection node (NCEj) comprises two connection agents identical to the connection agent (NCSi), connected head-to-tail, one of the two agents (NCS'j) receives and filters the transactions sent by the node (Nj) to which it is connected. The other agent (NCS"j) receives and filters the transactions sent by the other nodes (Nj) to which it is connected. Its applications specifically include the construction of an entire range of machines: UMA, QUASI-UMA, NUMA, cluster, etc.

36 Claims, 5 Drawing Sheets

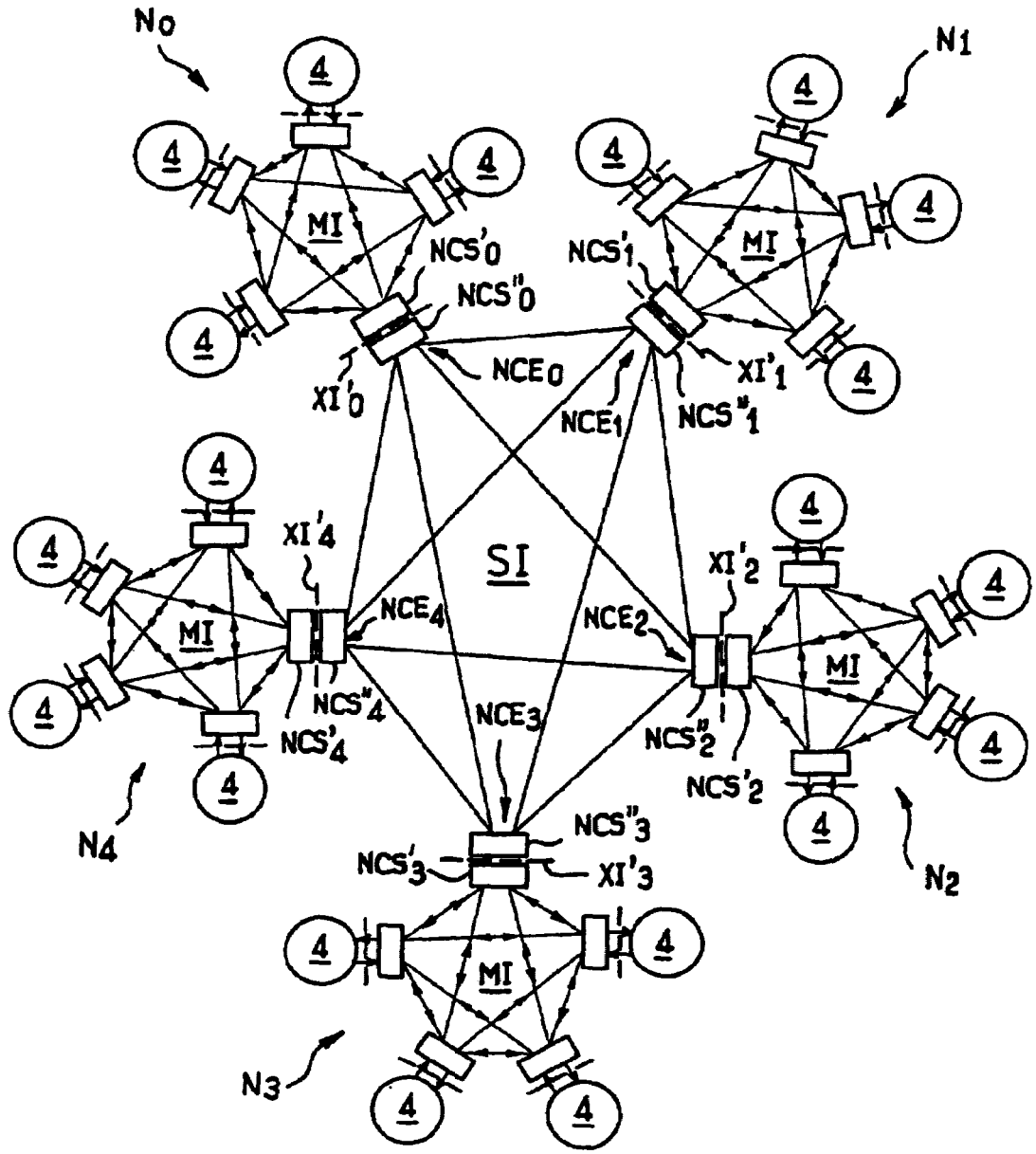
FIG_4

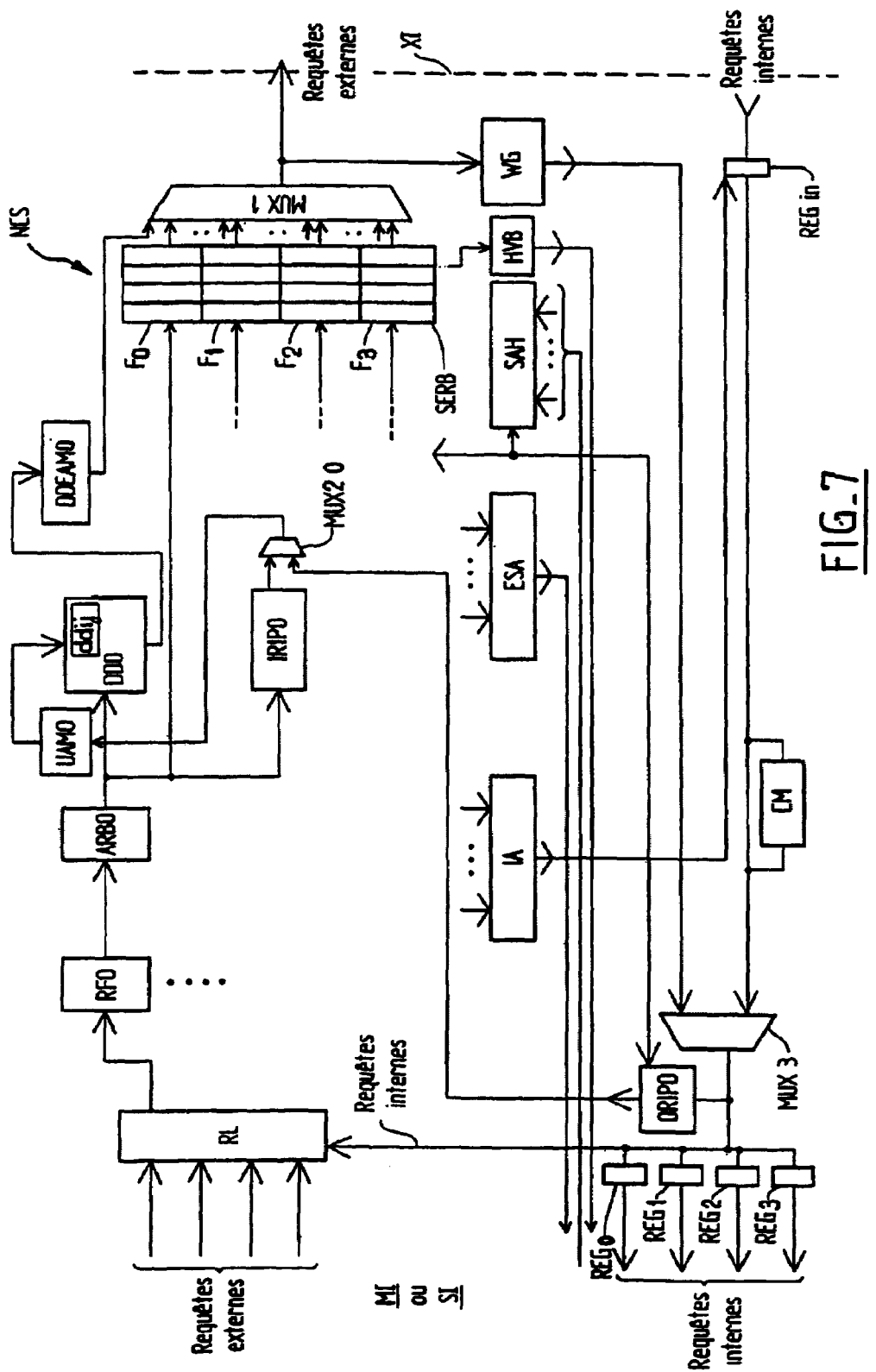
FIG_7

MODULAR INTERCONNECTION ARCHITECTURE FOR AN EXPANDABLE MULTIPROCESSOR MACHINE, USING A MULTILEVEL BUS HIERARCHY AND THE SAME BUILDING BLOCK FOR ALL THE LEVELS

BACKGROUND OF THE INVENTION

1. Field of the Invention

The present invention relates to the field of multiprocessor machines with symmetrical architectures comprising memories with uniform access and cache coherency, better known by the term "CC-UMA SMP" (Cache Coherent-Uniform Memory Access Symmetrical Multiprocessor).

More specifically, it concerns an interconnection architecture between a large number of processors organized into clusters of multiprocessor modules, also called nodes of a computer system.

2. Description of Related Art

In such machines, one or more levels of cache memory of each processor store data that has been recently acquired and can be reused quickly, thus preventing subsequent contentions for memory access.

When a processor does not find the desired data in its own cache memory, it transmits the address of the storage area in which it wishes to read the data via the system bus.

All the processors check their cache memories to see if they have the most recently updated copy of the data at this address.

If another processor has modified the data, it informs the sending processor that it can retrieve the data contained in its cache memory instead of requesting it from physical storage.

In order for a processor to be able to modify a storage area, it must obtain authorization to do so.

After such a modification, all the other processors that have a copy of the data that has just been modified must invalidate this copy in their respective cache memories.

A trace of the transactions passing through the system bus and a cache coherency control protocol will keep a record of all the transactions exchanged between the processors.

Conventionally, four fundamental states of the coherency protocol of the memories are distinguished, currently standardized under the code MESI, the abbreviation for "Modified state, Exclusive state, Shared state, Invalid state."

Generally, managing exchanges between the memories of a computer system consists of updating or invalidating copies of a storage block.

If invalidation is chosen, it is known, for example, to add to the address of each block two bits representing the state of the block in the memory.

According to this protocol, and in each node, the state "M" corresponds to the case in which a given cache memory is the only holder of a modified copy of a block, called the reference copy, and in which there are no other valid copies in the system. In this case, the cache memory holding the copy having the state "M" is responsible for supplying and updating the internal memory if it wants to dump this copy. A copy having the exclusive state "E" is also a reference copy held by a cache memory, but in this case, the internal memory has an updated copy of it. The shared state "S" relates to a copy that may have several holders, but only one copy of it is up-to-date in the internal memory. The potential holders depend on the management strategy adopted. Finally, there is the invalid copy state "I" when the cache memory has a copy of the block that is not valid. When a processor wants to access a block in the "I" state, its cache memory sends a request through the system bus to acquire the block. The other cache memories and the internal memory connected to the system bus learn of this request and react as a function of the state of the copy that the corresponding memory has. Thus, if a cache memory has the block in the modified state "M," it supplies the block to the system bus, thus allowing the processor to request access to the data and its cache memory to acquire the reference copy. There are still other optional states, which may or may not be standardized.

Management of this type is adopted particularly when several processors frequently modify the data sent via the system bus.

Since the storage areas are all accessible in the same way by all the processors, the problem of optimizing the location of the data in a given storage area no longer exists.

That is what characterizes uniform memory access UMA.

This type of management is reliable as long as the system bus is not saturated by too many processors sending too many memory access requests at the same time.

With the increase in the level of component integration, it is possible to store more and more processors on the same card, and processor speed increases by 55% per year.

An article by Alan Charlesworth (Sun Microsystems) published in *IEEE Micro*, January/February 1998, pages 39–49, describes an architecture for interconnection between several nodes, adapted to such constraints.

This interconnection architecture uses a packet switching protocol that makes it possible to separate the requests and the responses, allowing transactions between several processors to overlap in the bus.

Furthermore, it uses an interleaving of several control busses. Thus, the utilization of four address busses makes it possible to check four addresses in parallel. The physical storage space is divided by four and each address bus checks a quarter of the memory.

With such an architecture, it is possible to connect between 24 to 64 processors using 4 address busses and an automatic switching device, also known as a "crossbar," between each node, each node comprising a minimum of four processors.

The interconnection of the modules uses the memory coherency protocol defined above and makes it possible to perform transactions between modules between two levels of interconnection:

a first level of interconnection, at the node level, conveying the internal traffic of the node, issuing from the processors and the memories, to the output addresses of the node and of the data ports; and a second level of interconnection, at a higher level, transferring the addresses and the data between the various nodes of the system.

The memory access requests (commands and addresses) are broadcast to all of the nodes in order to consult their directories to locate the data that a processor of the system needs to access.

The memory access time is independent of the node in which the physical memory is located.

Two other types of interconnection may be distinguished, according to the type of information processed; interconnection in the address space and interconnection in the data space.

One of the disadvantages of such an architecture resides, in particular, in the utilization of a "crossbar," which includes a large number of connection points and therefore takes up a lot of space, centralized on the backpanel to which the nodes constituting the machine are connected.

This architecture also requires an "active" backpanel, i.e., one that comprises logical components, as opposed to a "passive" backpanel without any logical components.

In this type of machine, it is necessary to duplicate the "crossbar" in order to obtain good availability, and in the event of a failure, part of the usable bandwidth is lost.

A machine of this type is therefore not conducive to the adaptation of new multiprocessor modules to different machine configurations and thus does not allow for the desired modularity.

SUMMARY OF THE INVENTION

The object of the invention is specifically to eliminate these drawbacks.

One object of the present invention is to propose a modular interconnection architecture that makes it possible to absorb the traffic from all the multiprocessor modules with a variable capacity in terms of the number of processors.

To this end, the first subject of the invention is a modular interconnection architecture for an expandable multiprocessor machine, based on a virtual bus hierarchy, comprising a given number of multiprocessor modules organized into nodes and distributed on at least two interconnection levels: a first level corresponding to the interconnection of the multiprocessor modules within a node and a second level corresponding to the interconnection of the nodes with one another, the first interconnection level comprising connection agents that connect the multiprocessor modules to one another and handle the transactions between the multiprocessor modules, the second interconnection level comprising external connection nodes that connect the nodes to one another and handle the transactions between the nodes.

The interconnection architecture according to the invention is characterized in that the connection agents and the external connection nodes, respectively, have the same basic structure, the same external interface, and implement the same coherency control protocol for the cache memories of the processors.

The second subject of the invention is a process for tracing data blocks in an interconnection architecture as defined above, characterized in that it consists, on the first level, of duplicating in the associative memories only the modified data blocks in the cache memories of the multiprocessor modules, and of tracing only these modified blocks in the node.

The process consists, on the second level, of duplicating in the associative memories of the connection agents of each external connection node only the modified blocks exported, or conversely imported, and of tracing only the modified blocks exported, or conversely imported, between each node of the machine.

The third subject of the invention is a process for expanding the capacity of a machine comprising a first given number of first-level processors, organized into a first given number of multiprocessor modules and capable of being inserted into an interconnection architecture as defined above, characterized in that it consists of disconnecting one of the first-level multiprocessor modules from its connection agent and of connecting, via this freed connection agent, a second given number of processors organized into a second given number of multiprocessor modules, also capable of being inserted into an interconnection architecture as defined above.

Finally, the fourth subject of the invention is an expandable multinode multiprocessor machine, characterized in that it comprises an interconnection architecture as defined above.

The invention has the particular advantage of being modular and expandable as desired.

In fact, it makes it possible, while still using the same building block, typically a four-processor module associated with its connection agent NCS, or "Network ChipSet," to adapt the number of processors required to cover a very wide range of machines such as UMA, quasi-UMA, or NUMA (Non-UMA) machines, clusters (a term used to designate a set of machines connected by means of a SAN—System Area Network), etc., and to support different operating systems (NT, UNIX, etc.).

NT and UNIX are registered trademarks, and respectively belong to Microsoft and X/Open.

The structure of the building block defined above is generally supported by the same silicon ship.

The present invention also eliminates the need for an active "crossbar" in a backpanel (active backpanel).

BRIEF DESCRIPTION OF THE DRAWINGS

Other advantages and characteristics of the present invention will emerge through the reading of the following description, given in reference to the attached drawings, which represent:

FIG. 4, the interconnection architecture of FIGS. 1 and 3, developed on both interconnection levels MI and SI;

FIG. 7, the block diagram of the command and address space of the connection agent NCS of FIG. 2;

DESCRIPTION OF THE PREFERRED EMBODIMENT(S)

Figure 1:
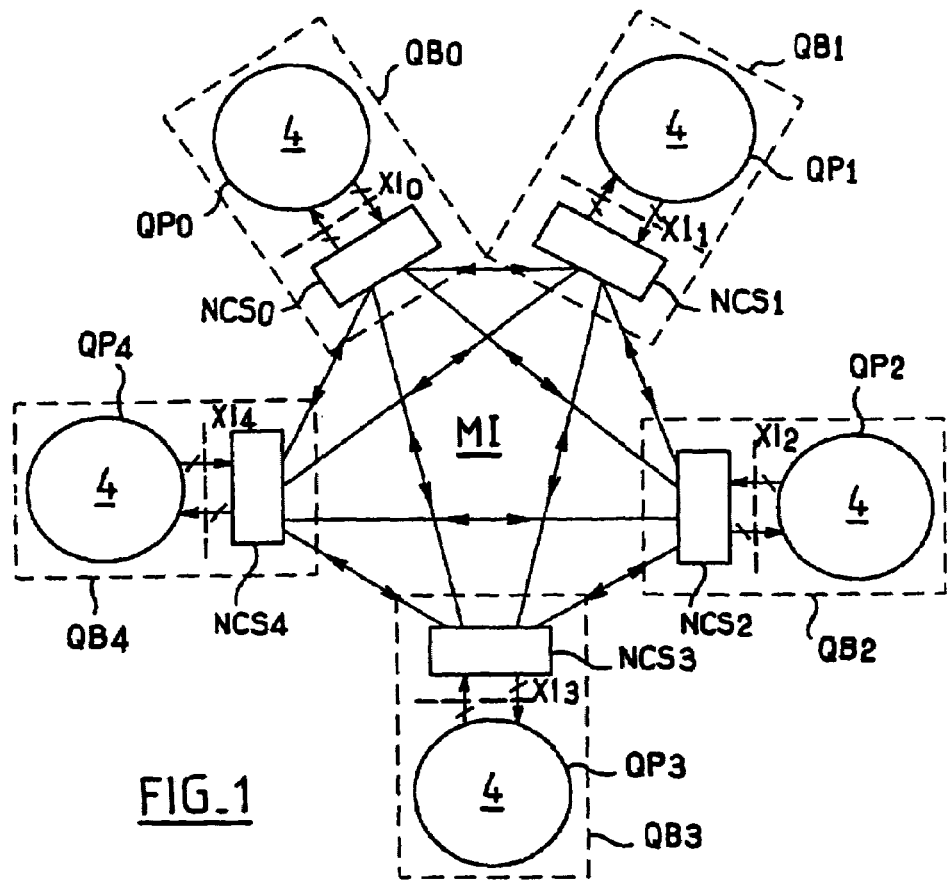
FIG. 1, an exemplary interconnection architecture according to the invention on a first interconnection level MI.

FIG. 1 schematically illustrates an interconnection architecture for a quasi-UMA machine, typically located on the backpanel of a computer cabinet.

In this example, five multiprocessor modules QPi, with i=0 to 4, are interconnected by means of an interconnection module MI.

Each multiprocessor module QPi comprises four processors and their respective cache memories, not represented, forming a four-processor module.

The four-processor modules QPi are connected to the interconnection module MI by means of respective network connection agents NCSi.

XIi (eXternal Interface) defines the external interfaces between the four-processor modules QPi and their respective connection agents NCSi. They are respectively symbolized by a straight broken line.

The assembly formed by the four-processor module QPi, its connection agent NCSi and its external interface XIi are considered to constitute a "building block" of the first level of the interconnection architecture according to the invention.

The interconnection module MI in the example illustrated includes five first-level building blocks QBi, respectively delimited by a closed broken line.

Each building block QBi is linked to the other four via four respective point-to-point links, not referenced in order not to overcomplicate the figure. These links are considered, at the protocol level, as virtual busses. Thus, in the example described, there are four virtual busses and hence four levels of interleaving handled by each connection agent NCSi. Each bus thus allows four accesses, or transactions, in each clock cycle.

The protocol according to the invention makes it possible to control the transactions sent through the interconnection module MI every four clock cycles.

It is based on the following principle:

When a processor sends a request through its bus, for example: read the address of the cache memory containing the data block "a," the only building blocks QBi that can be chosen are those in which there is a cache memory corresponding to this address.

According to the invention, we want to allow the transaction only to the building block QBi that actually contains the block "a" in one of its cache memories, and to consult only the building blocks QBi having this address, without disturbing the others.

Figure 2:
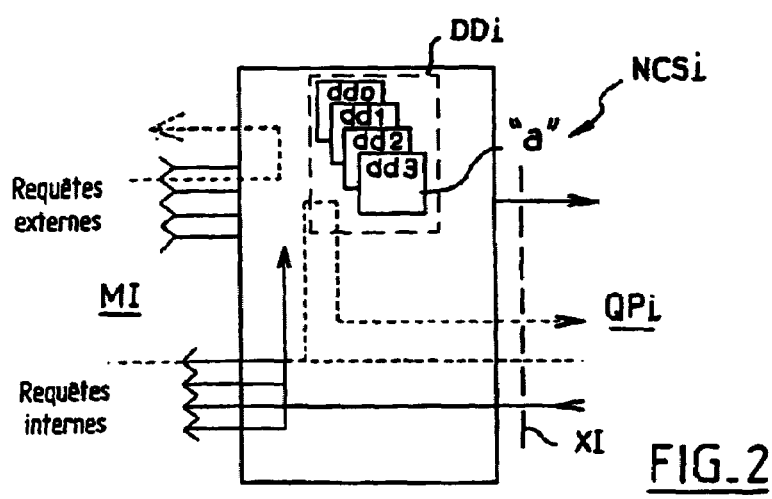
FIG. 2, the functional diagram of a connection agent NCS according to the invention.

For this reason, each connection agent NCSi of the architecture according to the invention, illustrated schematically in FIG. 2, comprises an associative or quasi-associative memory DDi, also known as a "duplicate directory," delimited by a closed broken line.

Each associative memory DDi contains a copy of the contents of the cache memories of the processors of a building block QBi to which it is dedicated.

The contents of the cache memories are organized into four levels of interleaving dd0 through dd3, respectively corresponding to the four processors of the building lock QBi.

Each memory DDi thus contains all the directories of the four processors of the modules QBi, accessible by an address.

The associative memories DDi have a fixed size determined as a function of the number of processors in the building block QBi, and the state of the memories DDi is indicative of the presence of the last data blocks modified in the cache memories of the building block QBi.

Thus, each associative memory DDi plays the role of a filter with respect to the building block QBi to which it is dedicated, in the sense that a transaction is only carried out when an associative memory DDi contains the last modified copy of the block "a".

The dotted lines represent the path, or "snooping," followed by the protocol in order to consult the state of the associative memories DDi before beginning a transaction.

The connection agent NCSi comprises, on the right side of the figure, the external interface XI for connecting to a four-processor module QPi.

It is connected, on the left side of the figure, via the four inbound and outbound links of FIG. 1, to the other four building blocks QBi of the interconnection module MI.

The protocol according to the invention is based on the principle according to which only the modified blocks are duplicated in the associative memories DDi of the connection agents NCSi.

Thus, it is possible, with an architecture on a level according to that of FIG. 1 and connection agents NCS according to FIG. 2, to interconnect, and to handle the flow of transactions typically exchanged between, 4 to 20 processors.

Hereinafter, this architecture will be considered to define a first level MI of a modular architecture according to the invention.

Figure 3:
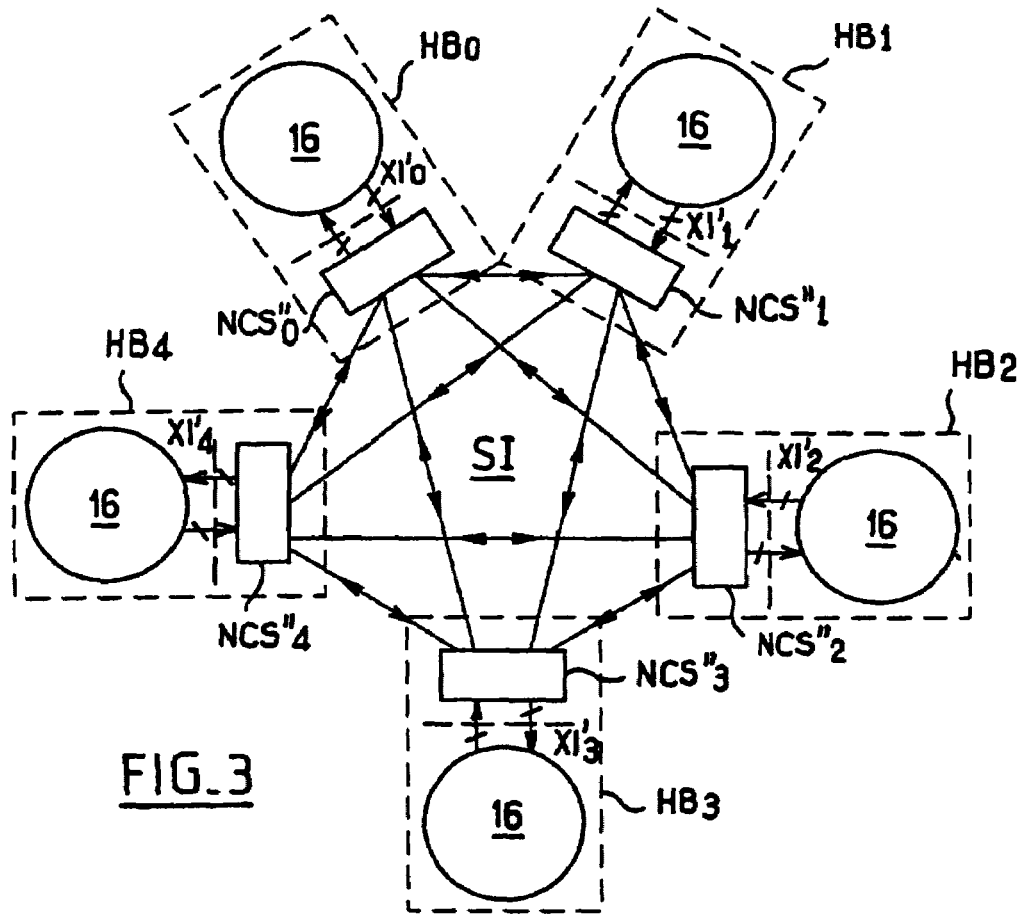
FIG. 3, an exemplary interconnection architecture according to the invention on a second interconnection level SI.

FIG. 3 illustrates, in a diagram similar to that of FIG. 1, a second level of the modular architecture defined above that integrates the first level MI, which can be considered to be a building block for the second level SI.

According to this embodiment, five second-level building blocks HBj, with j=0 to 4, are connected to the interconnection system SI via their respective connection agents NCS"j and their respective interfaces XI"j. The interconnection system SI, with respect to the blocks HBj of the second level, behaves like the interconnection module MI with respect to the blocks QBi of the first level.

FIG. 4 schematically illustrates an architecture similar to the one illustrated in FIG. 3, developed on both interconnection levels MI and SI. It typically makes it possible to interconnect up to 80 processors for second-level building blocks HBj, respectively comprising 16 processors. Each second level building block HBj respectively includes four first-level building blocks QBi, which themselves respectively include 4 processors.

Expanding the capacity of a machine consists of increasing its number of processors.

The expansion process according to the invention consists, in a first step, of disconnecting one of the five four-processor modules QPi of the first level, the module QP3 in the example in question, from its connection agent NCS3, and in a second step, of connecting the second-level architecture SI using the freed connection agent, NCS3 in the example illustrated in FIG. 1, which will be renamed NCS'j, with j=0 in the example in question.

The interconnection system SI is connected to the interconnection module MI via a connection agent NCS"0 disposed head-to-tail relative to the agent NCS'0, the external interface XI'0 being physically disposed between the first and the second connection agents NCS'0 and NCS"0.

Figure 5:
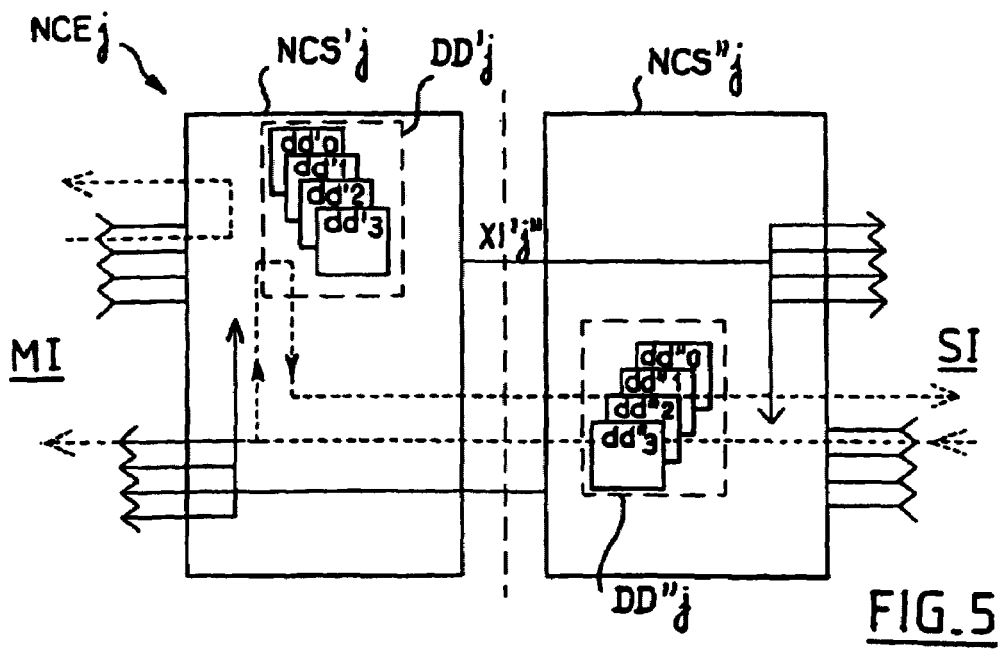
FIG. 5, the functional diagram of an external connection node NCE connecting the first-level network MI to the second level network SI according to the invention.

The two connection agents NCS'j and NCS"j, connected head-to-tail, illustrated schematically in FIG. 5, are therefore seen by the interconnection system SI as a single connection agent NCS"j, as represented in FIG. 3. The two connection agents NCS'j and NCS"j, connected head-to-tail, and their interface XI'j, define an external connection node NCEj through which pass the transactions between the various processors on the first level MI and those of the second level SI in accordance with the protocol according to the invention.

The protocol according to the invention makes it possible to maintain the coherency of the various cache memories distributed on the two interconnection levels MI and SI by consulting the respective associative memories of the agents NCS'j and NCS"j. One of the characteristics of the protocol according to the invention is its tracing capacity, not only for a building block QBi of the first level MI, but for all the building blocks QBi and HBj of both levels MI and SI.

In order to absorb the traffic between the two levels MI and SI while retaining the same bandwidth XIi and XI"j and the same building block for both levels MI and SI, i.e., associative memories DDi, DDi' and DD"j of the same size no matter what the number of levels, the latency of the second level SI is chosen so as to be greater than that of the first level MI. It is typically equal to one clock cycle for the first level MI and equal to two clock cycles for the second level SI. It is thus possible to construct, from a modular interconnection architecture according to the invention and consistent with the examples illustrated in FIGS. 1 through 5, at least two types of machines: a first machine with 4 to 20 processors and a second machine with more than 60 processors.

Two distinct modes are defined for parameterizing an external connection node NCEj as a function of the level of the interconnection architecture in which the desired information is located: the MI mode and the SI mode.

According to the trace principle established in the MI mode, only the modified blocks are duplicated. In the SI mode, the trace is only performed on the modified blocks exported. The exportation of modified blocks is understood to go in the direction from the first level MI to the second level SI, or from the lower level to the higher level. Symmetrically, the importation of modified blocks is understood to go in the direction from the second level SI to the first level MI, or from the higher level to the lower level.

When a processor of a first node N0 requests to exclusively read (read-invalidate "a") a block "a" located in another node Nj, the request is broadcast to all of the nodes Nj via the four virtual busses of the interconnection system SI.

This broadcasting may be likened to the known broadcast mode that applies to a multiple bus; the ten point-to-point links of the interconnection system SI behave like four virtual busses in the protocol sense.

The external connection node NCEj behaves like an external agent when it is parameterized in the external mode.

In this (multinode) configuration, the acknowledgement of an invalidate command is the aggregate, in the external agent of the requesting module, of the partial acknowledgements sent by the external agents of the other nodes Nj.

The agent NCS" has the same function, for the second level (16 processors) that the agent NCS has for the first level (4 processors).

The main operational differences between the agent NCSi and the agent NCS"j are summarized in the following table with respect to the aspects of link latency, associative memory, invalidate commands, and read-and-invalidate commands:

|  | NCSi (MI) | NCS"J (SI) |
|---|---|---|
| latency of the links | 1 clock cycle (backpanel) | 2 clock cycles (cables) |
| associative memory | duplication of the 4 cache memories of the processors | partial duplication of the 16 cache memories of the processors in the node (only the imported modified blocks are traced with precision |
| invalidate | filtered propagation to the cache memories of the 4 processors in the module | propagation to the NCSi of each of the 4 building blocks of the module (explicit acknowledgement by means of a response through the network from the module MI) |
| read and invalidate | the supplying of the data is contingent on acknowledgement of the invalidation | its acknowledgement requires acknowledgement from the nodes of the system; no blocking of the data |

Likewise, the table below summarizes the operational differences between an agent NCSi and an agent NCS'j with respect to the aspects of associative memory, invalidate commands, and read-and-invalidate commands.

The agent NCS'j is disposed in the same place as an agent NCSi and handles traffic issuing from 64 processors rather than the 4 processors handled by the agent NCSi.

Figure 6:
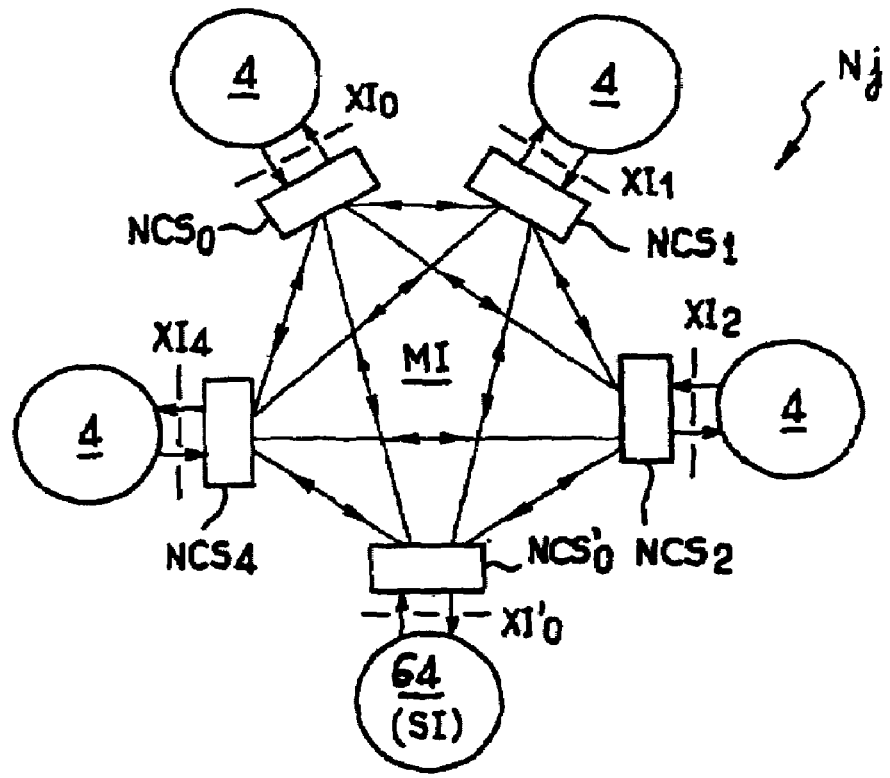
FIG. 6, an interconnection architecture of the first level MI with five nodes Nj wherein one of the nodes Nj is used to connect the second-level network SI.

The architecture considered in this table is illustrated in FIG. 6.

|  | NCSi | NCS"j |
|---|---|---|
| associative memory | duplication of the 4 cache memories of the processors | partial duplication of the 64 cache memories (only the imported and modified blocks are traced with precision) |
| invalidate | filtered propagation to the cache memories of the 4 processors in the node | propagation to the 64 processors on the second level (explicit notification) |
| reading and invalidate | the supplying of the data is contingent on acknowledgement of the invalidation | its acknowledgement requires acknowledgement from the nodes of the system; no blocking of the data |

The external interfaces XIi and XI'j have similar bandwidths.

When a requested block is identified in one of the associative memories DDi of the building blocks QBi, the requested block is "exported" from the cache memory containing the last updated copy of the block to the requesting processor. The new valid copy is then located in the cache memory of the requesting processor.

It is the coherency control protocol according to the invention that first searches for the associative memory DDi in which the modified block is located, then secondly, searches for the associative memory DD'j and DD"j of the external connection node NCEj that contains the information: the modified and exported block "a". The building block QBi containing the requesting processor is also identified in the node Nj.

The principle is symmetrical for the imported blocks. With this trace principle, based on the consultation of the associative memories of the connection agents NCSi and the external connection nodes NCEj, the bandwidth can remain constant for both levels and absorb disparate traffic between the various first- and second-level building blocks QBi and HBj.

The memory coherency control protocol according to the invention is thus capable of enabling the architecture to absorb transaction traffic in the worst case scenario, in which four of the five second-level building blocks HBj would simultaneously search for a block in the fifth building block.

FIG. 7 illustrates the block diagram of a connection agent NCSi according to the invention, considered in the command and address space.

The description of this diagram will make it possible to better understand the coherency control protocol used by the connection agent NCSi according to the invention.

All of the primary functions implemented on the first and second levels MI and SI are represented.

To simplify the figure, only the blocks that relate to the first level (i=0) of the four levels of interlacing are represented.

A first block RL performs a logical sequencing of the external requests received at the input of the agent (on the left side of the figure). The requests are sequenced in the same way no matter what the sending building block. For each of the inputs, the block RL has the capacity to handle several requests received simultaneously, in order to prevent a loss of requests in case of an unexpected halt in the flow of requests.

Logical filters RFi respectively receive the requests in the order imposed by the block RL. They respectively filter all the requests assigned to the same level of interlacing i and to the same system identifier of the building block.

Arbitration blocks ARBi are respectively connected to the outputs of the filters RFi. They select a request in accordance with a given algorithm, for example an equitable algorithm of the "Round Robin" type, wherein the last request chosen becomes the one with the lowest priority.

Associative memories DDi are respectively connected to the outputs of the arbitration blocks ARBi. Each associative memory DDi contains a copy ddij of the content of the cache memory of each processor of a building block. In the SI mode, the associative memories DD'j and DD"j respectively contain either a copy of the modified blocks exported or a copy of the modified blocks imported, depending on the direction of the transaction between the two levels MI and SI.

To force an input, i.e., to impose a new datum on an input, an invalidate command or a read and invalidate command is necessary in order to be able to reuse a cache memory that has already been validated in the associative memory DDi.

To do this, extensions DDEAMi to the associative memories DDi are connected to their outputs and are for slowing down the transactions intended to pass through the bus while waiting for the bus to be available (idle).

All the requests are serialized on output from the arbitration blocks ARBi and are then stored in a buffer memory SERB in which they are organized according to their status (internal/external, home/remote, hit/miss, shared/exclusive/modified) into four queues Fi, respectively corresponding to the four levels of interlacing i=0 to 3. Thus, four requests can be accepted in each clock cycle.

A multiplexer MUX1, on the right side of the figure, receives the external requests from the four queues Fi, and after validation by the memory extensions DDEAMi, the requests are sent, one by one, from the output of the connection agent NCS, which also corresponds to the output of the multiplexer MUX1, to the bus of the destination building block.

Blocks UAMi handle the updating of the associative memories DDi. There is one block per associative memory. These blocks UAMi store the updates that must be performed in the associative memories DDi, and they are executed when there is no traffic, or simultaneously, by all the building blocks.

Storage blocks IRIPi store all the transactions that are addressed to the same building block and that must wait for an end-of-transaction event such as:

end of access to main storage (reading of a transaction S, I);

update of the main storage (reading of a partial write transaction M, E). In the case of E, the data may be invalidated, thus indicating that the potential holder no longer holds the data and that the "home," i.e., the local cache memory containing the data block, must supply it;

end of transmission of an invalidate command;

and the transactions that have ended in a "hit E" or "hit M" in the building block, i.e, an access that has resulted in the state E or an access that has resulted in the state M, and that must wait for a given event to terminate them: end of read and invalidate in the system bus of the building block.

A logical block IA receives the responses related to the internal requests, issued by the arbitration blocks ARBi, and indicates for each of them whether they have succeeded "hit" or failed "miss" (defer: wait for its turn or retry because of a conflict).

A block ESA receives the responses to the consultations of the associative memories DDi and broadcasts these results to the other building blocks.

A block SAH receives and analyzes the responses to consultations of the following types:

a consultation of the read type (Read):
validates or clears an anticipated read request and waits for an update of the block (MI mode);
prepares a response to the sender of the request, and to the processor holding the requested block if it is different (SI mode);

a consultation of the partial write type (PartialWrite):
prepares the update of the block of the holding processor: writing into the block (SI mode).

A block HVB receives information on the filled state of certain storage blocks such as the blocks UAMi, DDEAMi, and informs the other building blocks in case of an imminent overflow of one of these blocks, so that they stop sending requests addressed to these blocks.

A partial write request (PartialWrite) is seen by a remote building block as a read-and-invalidate request.

A write generating block WG collects the requests sent through the bus from the output of the connection agent, which also corresponds to the output of the multiplexer MUX1, and updates the local building block by merging the data that has been partially written and the data that has been read.

Blocks ORIPi store all the operations requested by a given building block (read-wait for data request, invalidate-wait for acknowledgement request, etc.). These blocks examine the requests addressed to each node Nj issuing from a building block, not represented but which would be on the right side of the figure, in order to detect a collision between the current outbound local requests and inbound remote requests.

The respective outputs of the blocks ORIPi and IRIPi are multiplexed by multiplexers MUXi whose outputs are respectively connected to the inputs of the blocks UAMi. The updates of the memories DDi are performed either in a transaction resulting from external requests via the blocks IRIPi that therefore return to the connection agent NCS (top left of the figure), for example when a processor of a given node Nj wants to read a given block, or in a transaction resulting from internal requests via the block ORIPi that leave the connection agent NCS (bottom left of the figure), for example when a block is "kicked out" of the cache of a cache memory of a given processor.

A block CM collects the system identifier of the building block in which the desired storage space is located (the cache memory of the processor hosting the block that is the object of the request is there!).

A block SAH receives in a first series of inputs the responses to the consultations of the other building blocks. It performs a synthesis of these responses, which makes it possible to validate or invalidate the anticipated external read operations and also to know whether a request will be honored internally or externally.

In fact, the inputs of the local block SAH correspond to the outputs of the blocks ESA of the other building blocks.

A multiplexer MUX3, at the bottom left of the figure, receives the internal requests and the block writing operations linked to partial write operations issued by the block WG. It makes it possible to serialize the requests, which are then broadcast to the other four building blocks, respectively through the four links linking the sending building block to the other blocks, respectively via four output registers REG0 through REG3.

A fifth register REGin, at the right of the figure, is the input register of the agent NCS. It receives the internal requests arriving in the building block. It is controlled by the information issued by the logical block IA.

Figure 8:
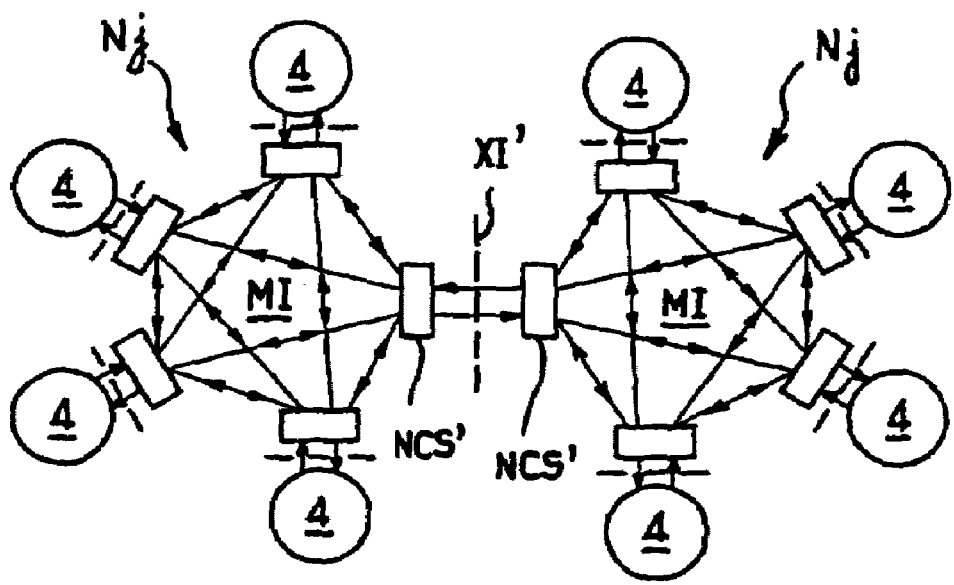
FIG. 8, an interconnection architecture according to the invention in which the first interconnection level SI is reduced to a link.

The same connection agent NCS, a functional description of which is given above, can be used in three different applications:

for connecting a four-processor module QPi to the module MI (FIG. 1);

for connecting a node Nj to the system SI (FIGS. 3, 4 and 6); and for connecting two nodes Nj (FIG. 8).

These three applications are implemented by the same component (chipset).

The processing and the path of this data through the connection agent NCS are not represented.

They are limited to the routing of the data, either from the interface XI to the module MI or the system SI or in the opposite direction, to the multiplexing of the data issuing from the module MI or the system SI.

The processing of the data is controlled by the address space of the connection agent NCS. This space supervises all the inbound and outbound data flows and if necessary, performs a translation between external or internal data labels.

The interface XI is a de-multiplexed interface and therefore comprises at least a command/address part and a data part.

To prevent a read response from overlapping an invalidate command, the read response must wait until all the commands serialized prior to the read request have been sent through the system bus of the four-processor module.

FIG. 8 illustrates a variant of embodiment of an architecture according to the invention.

This variant corresponds to an intermediate configuration limited to interconnecting between two nodes Nj with five four-processor modules QPi each.

In this configuration, in one module QPi of each node Nj, only the connection agent NCS' is retained, and the two nodes Nj are connected to one another via their respective connections agents NCS'.

This results in a 32-processor machine with a second interconnection level that is reduced to a link.

Thus, an interconnection without a system network SI is possible using only two connection agents NCS' connected head-to-tail, with an interface of the XI' type as the only external interface.

The latency of the system is improved, and the bandwidth XI' makes it possible to support an equal distribution of the data between the two nodes Nj. It is thus possible to expand the number of processors from 20 to 32 on the same operating system medium of a NUMA or quasi-UMA machine.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A modular interconnection architecture for an expandable multiprocessor machine, based on a virtual bus hierarchy, comprising a given number of multiprocessor modules (QPi), each module including a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors.

2. A modular interconnection architecture according to claim 1, characterized in that each external connection node (NCEj) comprises two identical connection agents (NCSi) connected head-to-tail, one of the two agents (NCS'j) receiving and filtering transactions sent by the node (Nj) to which it is connected, and the other agent (NCS"j) receiving and filtering the transactions sent by the other nodes (Nj) to which it is connected.

3. A modular interconnection architecture according to claim 2, characterized in that each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

4. A modular interconnection architecture according to claim 3, characterized in that the second interconnection level (SI) has a latency that is double the latency of the first interconnection level (MI).

5. A modular interconnection architecture according to claim 2, characterized in that the first and second head-to-tail connection agents (NCS'j and NCS"j) only accept transactions for blocks modified in their respective associative memories (DD'j and DD"j); modified data blocks in the first connection agent (NCS'j) being exported to the requesting multiprocessor module or modules and, conversely, modified data blocks in the second connection agent (NCS"j) being imported from the module or modules holding the blocks.

6. A modular interconnection architecture according to claim 5, characterized in that the second interconnection level (SI) has a latency that is double the latency of the first interconnection level (MI).

7. A modular interconnection architecture according to claim 2, characterized in that the second interconnection level (SI) has a latency that is double the latency of the first interconnection level (MI).

8. A modular interconnection architecture according to claim 1, characterized in that each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

9. A modular interconnection architecture according to claim 8, characterized in that the second interconnection level (SI) has a latency that is double the latency of the first interconnection level (MI).

10. A modular interconnection architecture according to claim 1, characterized in that the second interconnection level (SI) has a latency that is double the latency of the first interconnection level (MI).

11. A process for expanding the capacity of a machine comprising a first given number of processors on a first level (MI) organized into a first given number of multiprocessor modules (QPi) and capable of being inserted into an interconnection architecture comprising a modular interconnection architecture for an expandable multiprocessor machine, based on a virtual bus hierarchy, comprising a given number of multiprocessor modules (QPi), each comprising a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors, characterized in that it consists of disconnecting one of the first-level multiprocessor modules (QPi) from its connection agent (NCSi) to free said connecting agent and of connecting, via said freed connection agent, a second given number of processors organized into a second given number of multiprocessor modules, also capable of being inserted into said interconnection architecture.

12. A process according to claim 11, characterized in that, the second given number of processors being organized into a second given number of multiprocessor modules on a second level (SI), it consists of connecting it to the connection agent (NCSi) of the first given number of processors on the first level (MI) through one of the connection agents (NCS"j) on the second level.

13. A process according to claim 12, characterized in that, the second given number of processors also being on the first level (MI), and further comprising connecting the respective connection agents (NCS') to the first and second given numbers of processors, the second level (SI) being reduced to a single link.

14. A process for expanding the capacity of a machine comprising a first given number of processors on a first level (MI) organized into a first given number of multiprocessor modules (QPi) and capable of being inserted into an interconnection architecture comprising a modular interconnection architecture for an expandable multiprocessor machine, based on a virtual bus hierarchy, comprising a given number of multiprocessor modules (QPi), each comprising a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors, each external connection node (NCEj) comprises two identical connection agents (NCSi) connected head-to-tail, one of the two agents (NCS'j) receiving and filtering transactions sent by the node (Nj) to which it is connected, and the other (NCS"j) receiving and filtering the transactions sent by the other nodes (Nj) to which it is connected, characterized in that it consists of disconnecting one of the first-level multiprocessor modules (QPi) from its connection agent (NCSi) to free said connecting agent and of connecting, via said freed connection agent, a second given number of processors organized into a second given number of multiprocessor modules, also capable of being inserted into said interconnection architecture.

15. A process according to claim 14, characterized in the connection agents (NCS'j) and (NCS"j) respectively comprise an associative memory (DD'j) and (DD"j) with a fixed size determined as a function of the number of processors in the multiprocessor module (HBj) to which the connection agents (NCS'j) and (NCS"j) are connected, the state of the associated memories (DD'j) and (DD"j) being indicative of the presence of the last modified data blocks executed or conversely imported.

16. A process for expanding the capacity of a machine according to claim 14 wherein the first and second head-to-tail connection agents (NCS'j and NCS"j) only accept transactions for blocks modified in their respective associative memories (DD'j and DD"j); modified data blocks in the first connection agent (NCS'j) being exported to the requesting multiprocessor module or modules and, conversely, modified data blocks in the second connection agent (NCS"j) being imported from the module or modules holding the blocks.

17. A process for expanding the capacity of a machine according to claim 14 wherein the second interconnection level (SI) has a latency that is double the latency of the first interconnection level (MI).

18. A process for expanding the capacity of a machine comprising a first given number of processors on a first level (MI) organized into a first given number of multiprocessor modules (QPi) and capable of being inserted into an interconnection architecture comprising a modular interconnection architecture for an expandable multiprocessor machine, based on a virtual bus hierarchy, comprising a given number of multiprocessor modules (QPi), each comprising a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors, characterized in that it consists of disconnecting one of the first-level multiprocessor modules (QPi) from its connection agent (NCSi) to free said connecting agent and of connecting, via said freed connection agent, a second given number of processors organized into a second given number of multiprocessor modules, also capable of being inserted into said interconnection architecture, each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

19. An expandable multinode multiprocessor machine, comprising an interconnection architecture including a given number of multiprocessor modules including a modular interconnection architecture for an expandable multiprocessor machine, based on a virtual bus hierarchy, comprising a given number of multiprocessor modules (QPi), each module including a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors.

20. An expandable multinode multiprocessor machine as set forth in claim 19, characterized in that each external connection node (NCEj) comprises two identical connection agents (NCSi) connected head-to-tail, one of the two agents (NCS'j) receiving and filtering transactions sent by the node (Nj) to which it is connected, and the other agent (NCS"j) receiving and filtering the transactions sent by the other nodes (Nj) to which it is connected.

21. An expandable multinode multiprocessor machine as set forth in claim 19, characterized in that each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

22. An expandable multinode multiprocessor machine as set forth in claim 19, characterized in that each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

23. An expandable multinode multiprocessor machine as set forth in claim 19, characterized in that the first and second head-to-tail connection agents (NCS'j and NCS"j) only accept transactions for blocks modified in their respective associative memories (DD'j and DD"j); modified data blocks in the first connection agent (NCS'j) being exported to the requesting multiprocessor module or modules and, conversely, modified data blocks in the second connection agent (NCS"j) being imported from the module or modules holding the blocks.

24. An expandable multinode multiprocessor machine as set forth in claim 19, characterized in that the second interconnection level (SI) has a latency that is double the latency of the first interconnection level (MI).

25. A process for tracing data blocks in an interconnection architecture for an expandable microprocessor machine, based on a virtual bus hierarchy, comprising a given number of multiprocessor modules (QPi), each module including a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors, comprising duplicating on the first level in the associative memories (DDi) only modified data blocks in the cache memories of the multiprocessor modules (QPi) and tracing only the modified blocks inside the node (Nj).

26. A process for tracing data blocks as set forth in claim 25 wherein each external connection node (NCEj) comprises two identical connection agents (NCSi) connected head-to-tail, one of the two agents (NCS'j) receiving and filtering transactions sent by the node (Nj) to which it is connected, and the other agent (NCS"j) receiving and filtering the transactions sent by the other nodes (Nj) to which it is connected.

27. A process for tracing data blocks as set forth in claim 26, characterized in that the first and second head-to-tail connection agents (NCS'j and NCS"j) only accept transactions for blocks modified in their respective associative memories (DD'j and DD"j); modified data blocks in the first connection agent (NCS'J) being exported to the requesting multiprocessor module or modules and, conversely, modified data blocks in the second connection agent (NCS"j) being imported from the module or modules holding the blocks.

28. A process for tracing data blocks as set forth in claim 26, characterized in that the first and second head-to-tail connection agents (NCS'j and NCS"j) only accept transactions for blocks modified in their respective associative memories (DD'j and DD"j); modified data blocks in the first connection agent (NCS'J) being exported to the requesting multiprocessor module or modules and, conversely, modified data blocks in the second connection agent (NCS"j) being imported from the module or modules holding the blocks.

29. A process for tracing data blocks as set forth in claim 25 wherein each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

30. A process for tracing data blocks as set forth in claim 25, characterized in that the second interconnection level (SI) has a latency that is double the latency of the first interconnection level (MI).

31. A process for tracing data blocks in a modular interconnection architecture for an expandable multiprocessor machine, based on a virtual bus hierarchy, comprising a given number of multiprocessor modules (QPi), each module including a plurality of processors and associated cache memories organized into nodes (Nj) and distributed on at least two interconnection levels: a first interconnection level (MI) corresponding to interconnection of the multiprocessor modules (QPi) within a node (Nj), and a second interconnection level (SI) corresponding to the interconnection of the nodes (Nj) with one another, the first interconnection level (MI) comprising connection agents (NCSi) connecting the multiprocessor modules (QPi) to one another and handling the transactions between the multiprocessor modules (QPi), the second interconnection level (SI) comprising external connection nodes (NCEj) connecting the nodes (Nj) to one another and handling the transactions between the nodes (Nj), the connection agents (NCSi) and the external connection nodes (NCEj) respectively having the same basic structure, the same external interface (XI), and adapted to implement the same coherency control protocol for the cache memories of the processors, characterized in that it consists, on the second level (SI), of duplicating in the associative memories (DD'j and DD"J) of the connection agents (NCS' and NCS"j) of each external connection node (NCEj) only the modified blocks exported, or conversely imported, and of tracing only the modified blocks exported, or conversely imported, between each node (Nj) of the machine.

32. A process for tracing data blocks as set forth in claim 31, wherein each external connection node (NCEj) comprises two identical connection agents (NCSi) connected head-to-tail, one of the two agents (NCS'j) receiving and filtering transactions sent by the node (Nj) to which it is connected, and the other agent (NCS"j) receiving and filtering the transactions sent by the other nodes (Nj) to which it is connected.

33. A process for tracing data blocks as set forth in claim 32, wherein each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

34. A process for tracing data blocks as set forth in claim 32, wherein the first and second head-to-tail connection agents (NCS'J and NCS"j) only accept transactions for blocks modified in their respective associative memories (DD'j and DD"j); modified data blocks in the first connection agent (NCS'j) being exported to the requesting multiprocessor module or modules and, conversely, modified data blocks in the second connection agent (NCS"j) being imported from the module or modules holding the blocks.

35. A process for tracing data blocks as set forth in claim 31, wherein each connection agent (NCSi) comprises an associative memory (DDi) with a fixed size determined as a function of the number of processors in the multiprocessor module (QPi) to which the connection agent (NCSi) is connected, the state of the memories (DDi) being indicative of the presence of the last modified data blocks in the cache memories of the multiprocessor module (QPi).

36. A process for tracing data blocks as set forth in claim 31, wherein the second interconnection level (SI) has a latency that is double the latency of the first interconnection level (MI).

* * * * *